(12) United States Patent
Danhash

(10) Patent No.: US 8,458,876 B2
(45) Date of Patent: Jun. 11, 2013

(54) AXIAL SWAGE TOOL

(75) Inventor: May Danhash, Sherman Oaks, CA (US)

(73) Assignee: Designed Metal Connections, Inc., Gardena, CA (US)

( * ) Notice: Subject to any disclaimer, the term of this patent is extended or adjusted under 35 U.S.C. 154(b) by 316 days.

(21) Appl. No.: 12/853,124

(22) Filed: Aug. 9, 2010

(65) Prior Publication Data

US 2012/0030917 A1 Feb. 9, 2012

(51) Int. Cl.
*B23P 19/04* (2006.01)
*B21D 39/04* (2006.01)

(52) U.S. Cl.
USPC .................................. 29/237; 29/252; 29/282

(58) Field of Classification Search
USPC ................ 29/237, 283.5, 282, 520, 252, 235; 72/453.02
See application file for complete search history.

(56) References Cited

U.S. PATENT DOCUMENTS

| | | | |
|---|---|---|---|
| 3,299,496 A * | 1/1967 | Christensen | 29/237 |
| 3,674,689 A * | 7/1972 | Giltrow et al. | 428/298.7 |
| 4,189,817 A * | 2/1980 | Moebius | 29/237 |
| 4,744,740 A | 5/1988 | Kojima | |
| 4,847,135 A * | 7/1989 | Braus et al. | 428/138 |
| 4,867,889 A * | 9/1989 | Jacobson | 508/106 |
| 5,297,325 A * | 3/1994 | Thelen | 29/237 |
| 5,305,510 A * | 4/1994 | Croft et al. | 29/237 |
| 5,483,731 A * | 1/1996 | Prendel et al. | 29/237 |
| 5,592,726 A * | 1/1997 | Suresh | 29/237 |
| 5,680,687 A * | 10/1997 | Hyatt et al. | 29/237 |
| 5,694,670 A * | 12/1997 | Hosseinian et al. | 29/237 |
| 6,430,792 B1* | 8/2002 | Foster et al. | 29/237 |
| 6,434,808 B1* | 8/2002 | McKay | 29/237 |
| 7,155,790 B2* | 1/2007 | Palejwala et al. | 29/237 |
| 7,337,514 B2* | 3/2008 | McKay | 29/237 |
| 7,805,823 B2* | 10/2010 | Sembritzky et al. | 29/516 |
| 2003/0167614 A1* | 9/2003 | Morrison et al. | 29/237 |
| 2005/0081359 A1 | 4/2005 | Palejwala et al. | |
| 2006/0016329 A1 | 1/2006 | Johnson | |
| 2009/0300917 A1* | 12/2009 | Hwang | 29/890.15 |

OTHER PUBLICATIONS

International search report and written opinion dated Jan. 18, 2012 for corresponding PCT application PCT/US11/47131 cites the U.S. patents and U.S. patent application publications above.

* cited by examiner

*Primary Examiner* — Lee D Wilson
*Assistant Examiner* — Tyrone V Hall, Jr.
(74) *Attorney, Agent, or Firm* — DLA Piper LLP (US)

(57) ABSTRACT

A swage tool for swaging axially swaged fittings includes a housing having an inner surface and a first yoke. A ram includes a recessed portion having a threaded inner surface portion. A piston includes a second yoke. A piston rod includes a spring holder and a threaded portion screwed into the threaded inner surface portion of the ram. A spring is connected to the spring holder. Carbon fiber bearings are provided on the ram and on an outer surface portion of the piston rod in axial slidable engagement with the inner surface of the housing.

21 Claims, 7 Drawing Sheets

AXIAL SWAGE TOOL

BACKGROUND OF THE INVENTION

1. Field of the Invention

This invention relates to a swaging tool for swaging axially swaged fittings.

2. Description of Related Art

Swaged fittings are commonly used to connect tubes and pipes to each other in areas of fluid systems where a secure connection is critical, such as oxygen and other fluid systems in the aircraft, marine, petroleum and chemical industries. Connected tubes that convey fuel or hydraulic control fluids in an aircraft, for example, must withstand vibration and other adverse conditions without failure. Conventionally, the ends of a tube are inserted into a fitting, usually in the form of a cylindrical sleeve, and the fitting is then swaged with a swaging tool to produce a fluid-tight connection between the tubes.

In one method of fitting, a radial swaging force is applied to the fitting and the tube, either externally around the fitting or internally within the tube. In either case, the radial swaging force is applied directly to the fitting and the tube by the swaging tool. In another method of fitting, a cylindrical sleeve is provided with a tapered outer surface and a cylindrical inner surface for receiving a tube. A deforming ring surrounds the sleeve and has a tapered inner surface which matches and engages with the tapered outer surface of the sleeve. Before swaging, the deforming ring is positioned outwardly with respect to the sleeve such that no radial force is applied by the deforming ring to the sleeve. During swaging, the deforming ring is moved axially in a forward direction over the sleeve such that the interaction of the tapered surfaces on the ring and the sleeve applies a radial force deforming the sleeve and the tube inwardly to make a swaged connection between them. These fittings are generally referred to as axially swaged fittings.

SUMMARY OF THE INVENTION

The present invention overcomes these drawbacks and provides a swage tool for swaging axially swaged hydraulic fittings and the like to join two or more tubes together. The swage tool of the present invention is simple to operate and reliable in use. The swage tool is designed efficiently to produce the same amount of swage force in a more compact and lightweight structure. The swage tool is preferably used with axially swaged fittings having a sleeve for receiving a tube and a swaging ring. When the ring is moved axially over the sleeve, it applies a radial force to the sleeve which swages the sleeve to the tube. The swage tool is not limited to, but may be used with fittings employing a sleeve with two swaging rings, a sleeve with a single swaging ring, or other appropriate configurations and combination to join the fitting to one or more tubes.

One embodiment of the invention is a swage tool having a housing including an inner surface and a first yoke. A ram includes a recessed portion having a threaded inner surface portion. A piston includes a second yoke. A piston rod includes a spring holder and a threaded portion that is screwed into the threaded inner surface portion of the ram. A spring connects to the spring holder. Carbon fiber bearings on the ram and on an outer surface portion of the piston rod are in axial slidable engagement with the inner surface of the housing.

The threaded connection between the ram and piston rod advantageously improves the structural integrity of the swage tool by rigidly aligning the three components (ram, piston, and piston rod) and results in the reduction of internal friction forces generated during swaging, thereby allowing the same amount of work to be accomplished with less swage force. The piston diameter may be reduced in order to reduce material and manufacturing costs of the swage tool. The sliding friction force is reduced between the housing, piston rod and the ram and further improves the effectiveness of the swage tool. Consequently, additional reduction in the swage tool's size and weight is achieved. Carbon fiber composite bearings located on the outer surface of the ram and piston rod, reduce undesirable bending moment generated during swaging and provide smooth movement of the piston and ram to reduce the amount of pressure needed to effectively operate the swage tool. Internal deflection and stresses and tool size and weight are thereby further reduced.

The housing of the swage tool further includes a port opening attachable to a hose assembly or pressure source such as a hydraulic fluid pressure source. A seal between the port opening and the ram prevents pressurized fluid from seeping past the ram. A pair of legs extend outwardly from the piston and the housing and are connected to the first and second yokes. A plug is attached to the housing and is in contact with the spring. The inner surface of the housing is cylindrical. The first and second yokes are substantially U-shaped and accept a swaging ring and a sleeve. The first and second yokes include a jaw for secure attachment to a swaging ring and a sleeve.

In another embodiment of the invention, a swaging system is provided for joining a first member to a second member. A fitting includes a first sleeve inserted over the first member and a second sleeve inserted over the second member. A first ring is provided over the first sleeve to axially swage the first sleeve to the first member. A second ring is provided over the second sleeve to axially swage the second sleeve to the second member. The system includes a swage tool configured as described above.

A method for assembling a swage tool according to the invention includes attaching a carbon fiber bearing over a ram and a piston rod; inserting a piston adjacent to the ram within the housing; inserting the piston rod through the piston; screwing a threaded portion of the piston rod is screwed into a threaded inner surface portion of the ram; and inserting the ram into the housing adjacent to a port opening of the housing.

Other features and advantages of the invention will be apparent from the following detailed description, taken in conjunction with the accompanying drawings which illustrate, by way of example, various features of embodiments of the invention.

DETAILED DESCRIPTION OF THE INVENTION

Figure 4A:
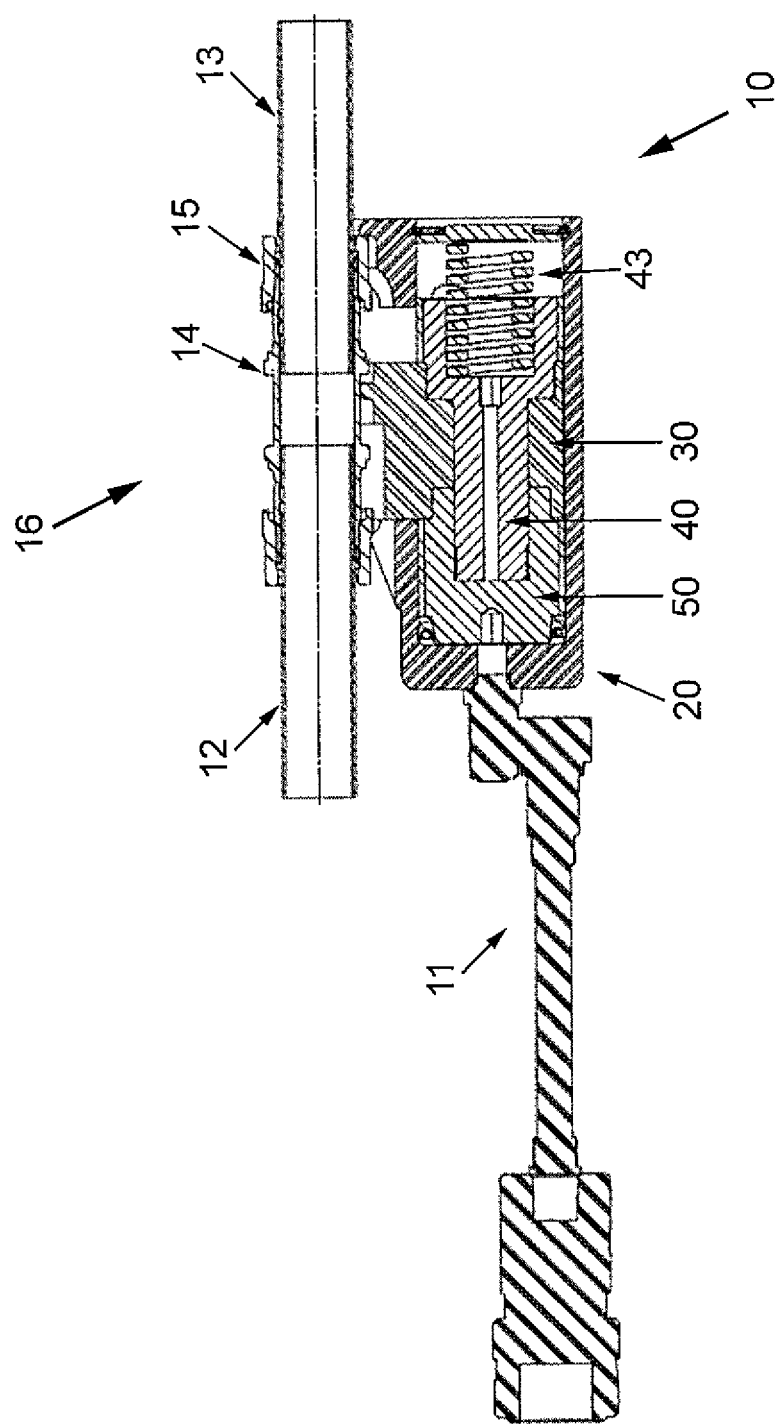
FIG. 4A is a cross-sectional view in a loaded open position of a swaging operation of the invention.
Figure 4B:
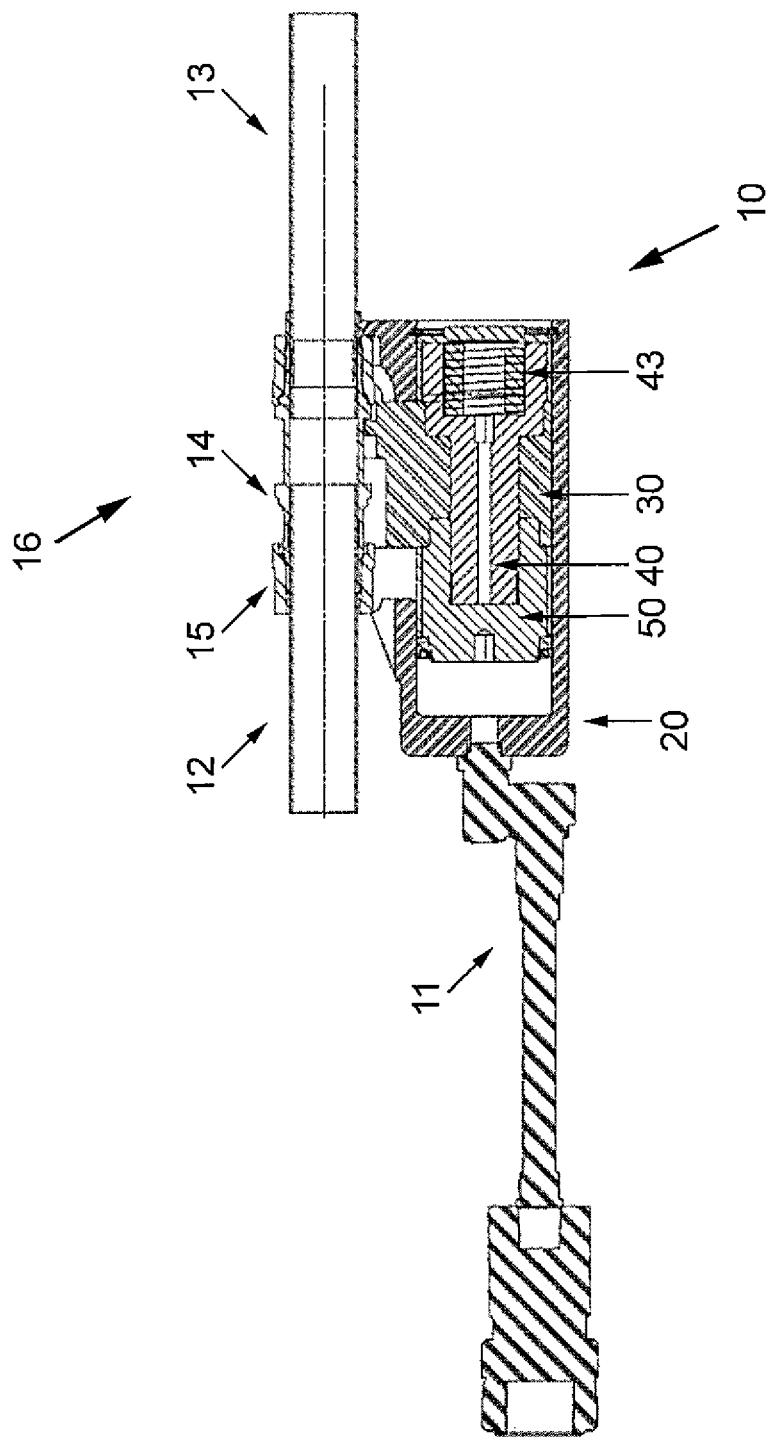
FIG. 4B is a cross-sectional view in a loaded closed position of the swaging operation.

One embodiment of the invention is a swage tool 10 for swaging a swaging ring 15 to join tube members 12 and 13 together. As shown in FIGS. 4A and 4B, swage tool 10 swages a fitting 16 having a cylindrical sleeve 14 with a tapered outer surface and a cylindrical inner surface for receiving tubes 12 and 13. Sleeve 14 is placed over tubes 12 and 13. Swaging rings 15 are placed over the ends of sleeve 14 and have an inner surface that matches and engages with an outer surface of sleeve 14. Before swaging, swaging ring 15 is positioned outwardly with respect to sleeve 14 such that no radial force is applied by swaging ring 15 to sleeve 14 (FIG. 4A). During swaging, swaging ring 15 is moved axially in a forward direction over sleeve 14 such that interaction of the tapered surfaces on ring 15 and sleeve 14 applies a radial force deforming sleeve 14 and tubes 12, 13 inwardly to make a swaged connection between them (FIG. 4B). Swage tool 10 of course is not limited to this specific configuration.

Figure 1:
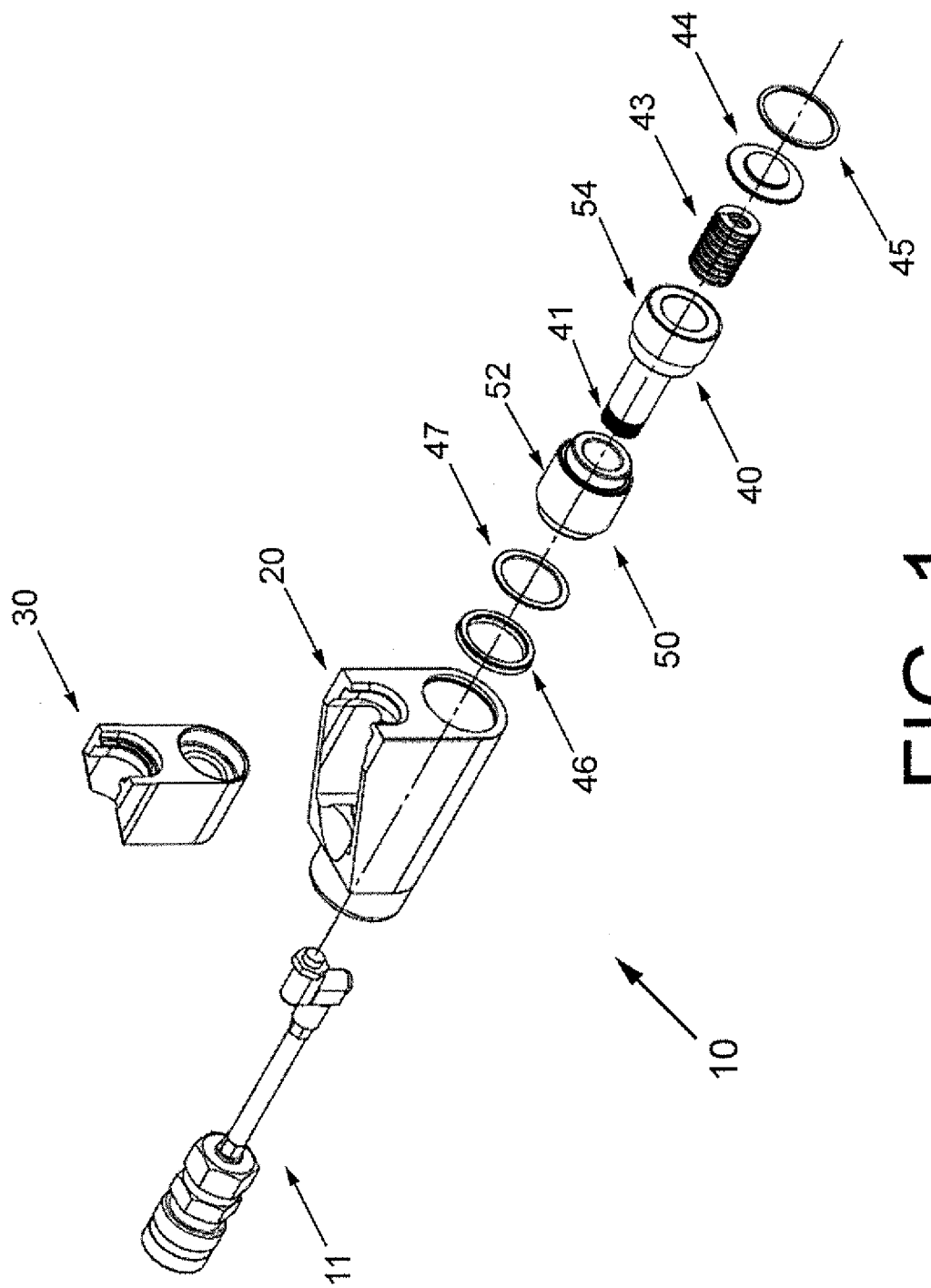
FIG. 1 is an exploded assembly view of a swage tool according to the invention.
Figure 2:
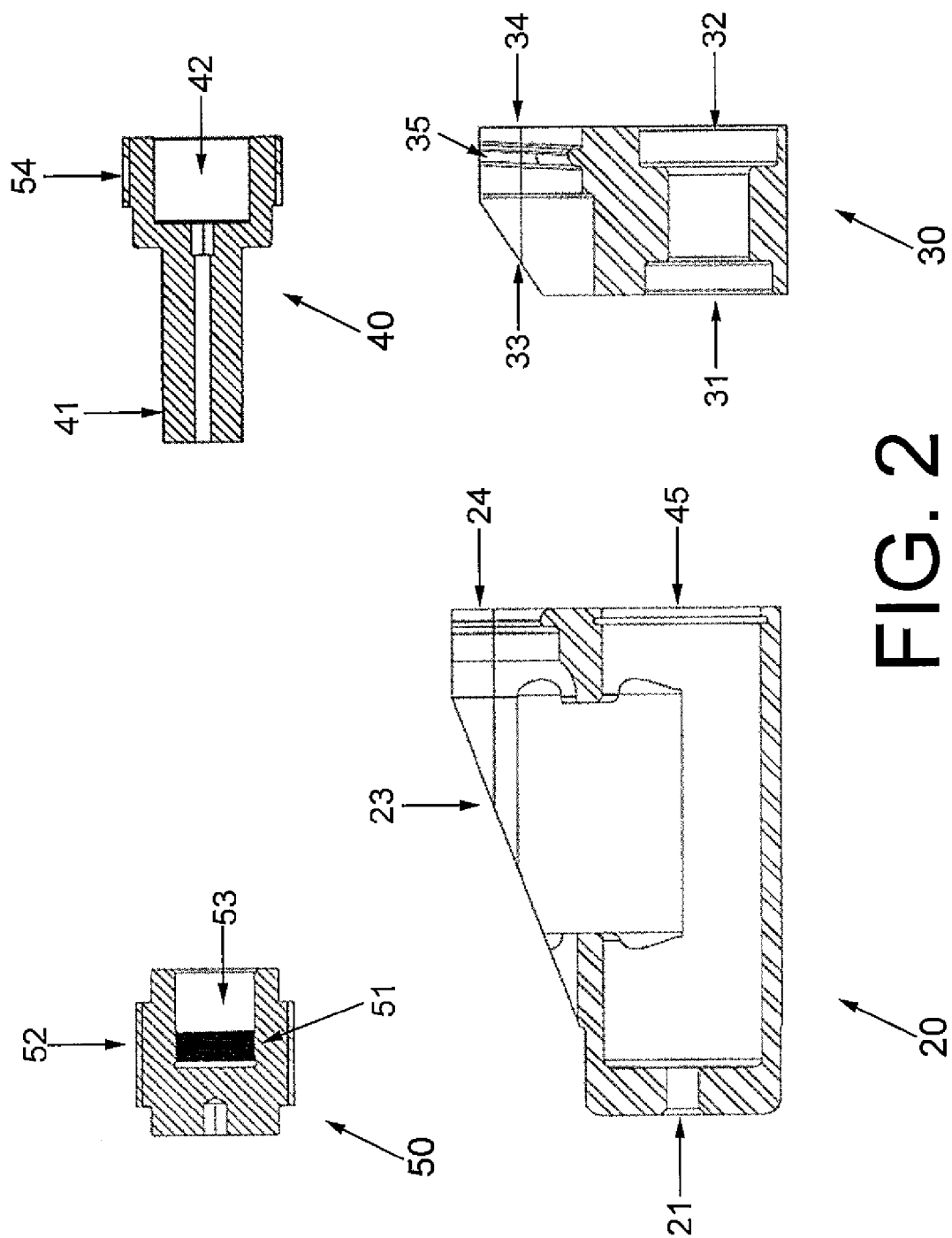
FIG. 2 is an exploded cross-sectional view of the swage tool.

FIG. 1 is an exploded assembly view of swage tool 10. Tool 10 includes housing 20 connected to quick disconnect hose assembly 11. Hose assembly 11 connects to housing 20 through a port opening 21, as best seen in FIG. 2. Hose assembly 11 connects to a pressure source such as a hydraulic fluid source or the like. Piston 30 is movable in opposite axial directions within housing 20 in sliding engagement. Ram 50 connects to and adjoins piston 30 and is connected to piston rod 40 as described in further detail below. Seal 46 and seal ring 47 fit around the port-side end of ram 50. Seals 46 and 47 prevent pressurized fluid from seeping past ram 50. Plug 44 and retaining ring 45 close the other end of housing 20.

The individual components of swage tool 10 are described below with reference to FIG. 2. Piston 30 includes ram opening 31 and piston opening 32. Ram 50 is covered by a carbon fiber bearing 52 wound around the outer surface of ram 50. The bearing 52 may also be a composite overlay bearing. The bearing 52 may be placed over a composite ram and piston rod or a metallic ram and piston rod. The carbon fiber bearing is in slidable engagement with the inner surface of housing 20, where the inner surface is cylindrical. Ram 50 further includes recessed portion 53 for insertion of piston rod 40. Recess 53 includes inner threaded portion 51 for connection to a corresponding threaded portion 41 of piston rod 40. Recessed portion 53 is also cylindrical. Piston rod 40 is inserted through ram 50 and piston 30 within housing 20. Similarly, spring holder 42 of piston rod 40 provides a recessed portion to house spring 43. Spring 43 is placed within spring holder 42 of piston rod 40 so as to contact piston rod 40 on one end of spring 43 and contact plug 44 at the other end. An outer surface portion of piston rod 40 in axial slidable engagement with housing 20 is covered by carbon fiber bearing 54.

Figure 5:
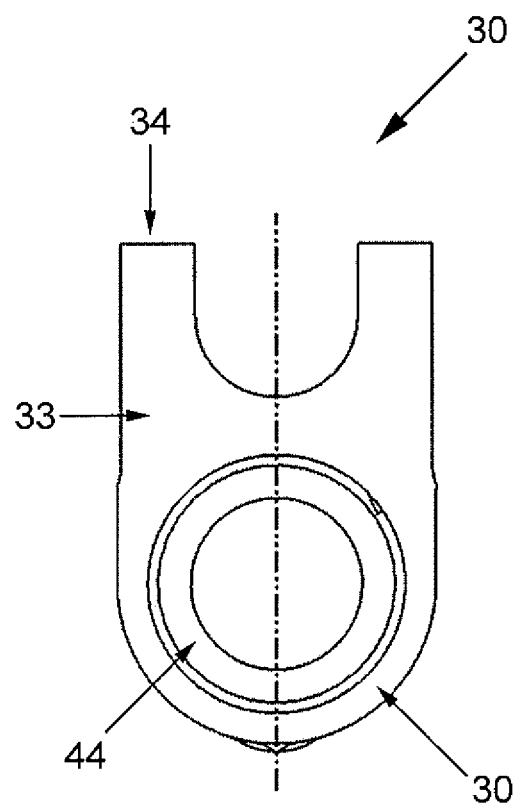
FIG. 5 is a front cross-sectional view of a piston of the swage tool.

FIG. 5 is a front cross-sectional view of piston 30 showing the U-shape of inner yoke 34 supported by legs 33. Piston rod 40 is provided in sliding engagement within piston 30. The inner surface of piston 30 and the outer surface of piston rod 40 have a cylindrical shape. Housing 20 is provided with a similarly U-shaped outer yoke 24 supported by legs 23. The legs extend outwardly from the piston and housing and connect to respective yokes. The shape of the yokes accommodates a swaging ring or a sleeve for secure attachment. For example, jaw 35 is provided on yoke 34 for engaging the swaging ring 15 or sleeve 14 for movement in the axial direction. Each yoke can include a jaw. Swage tool 10 may be made from forged metals having increased strength and properties over cast metals.

The threaded connection between ram 50 and piston rod 40 advantageously improves the structural integrity of swage tool 10 so as to reduce internal friction forces generated during swaging to thereby allow the same amount of work to be accomplished utilizing less swage force. Hence, the piston diameter may be reduced in order to reduce material and manufacturing costs of the swage tool. Furthermore, sliding friction is reduced because of carbon graphite composite bearings 52 and 54 that further improve efficiency and reduce internal friction forces of swage tool 10.

Figure 3A:
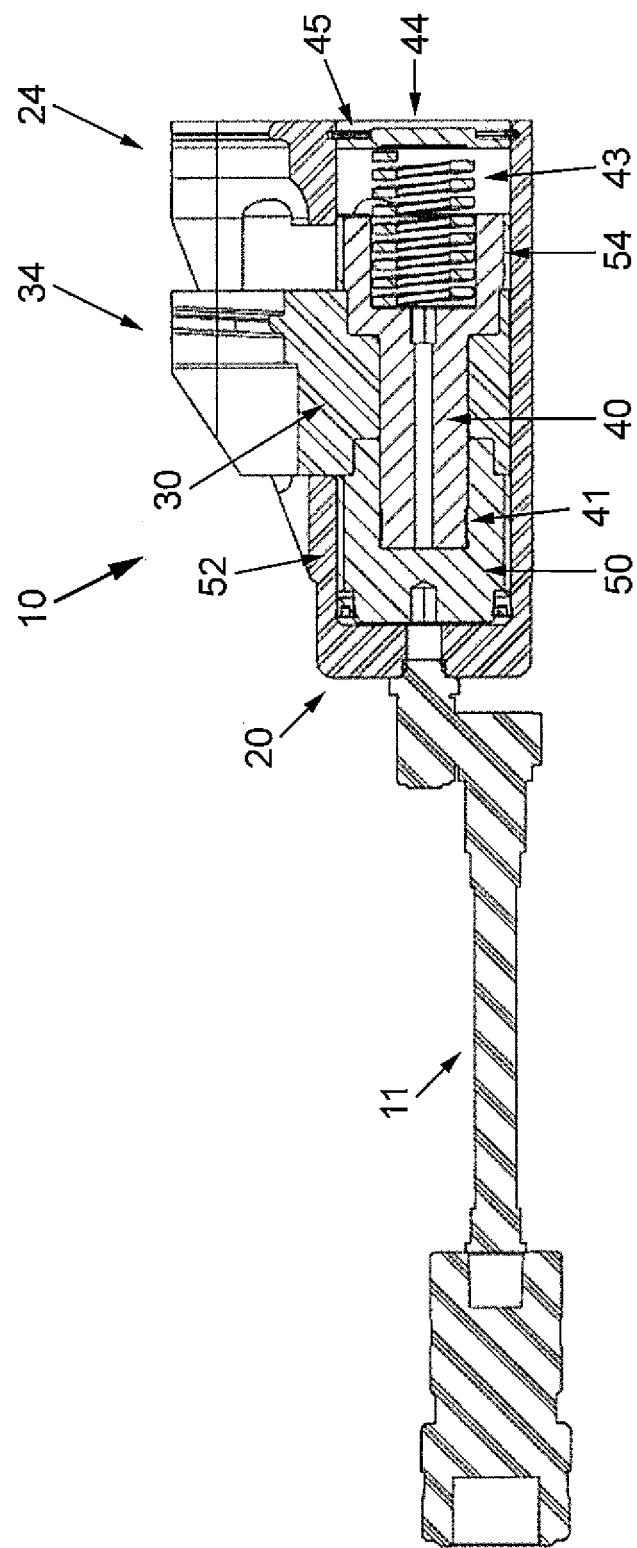
FIG. 3A is a cross-sectional view in an open position of the swage tool.
Figure 3B:
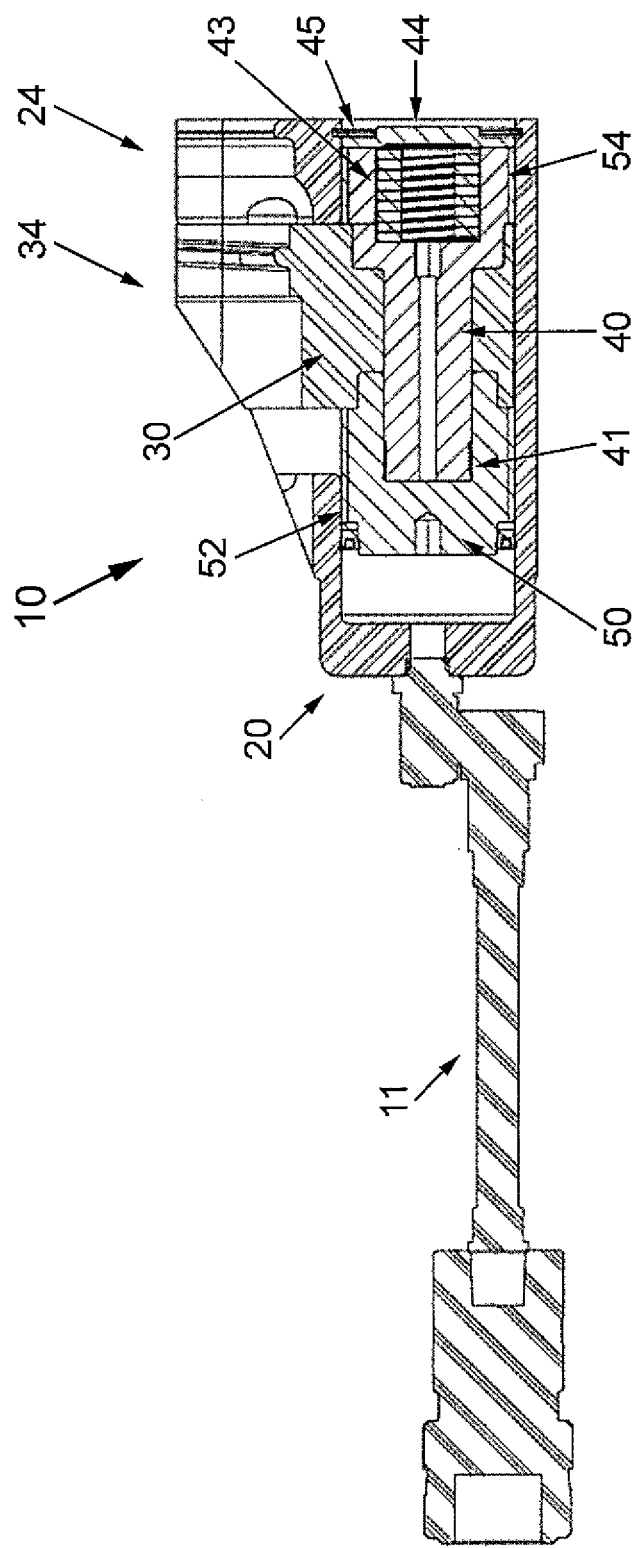
FIG. 3B is a cross-sectional view in a closed position of the swage tool.

Inner yoke 34 and outer yoke 24 connect to and move swaging ring 15 over sleeve 14 to thereby swage fitting 16 over tubes 12, 13. Each of the yokes is shaped to engage ring 15 or sleeve 14 to cause axial movement of swaging ring 15 over sleeve 14 to swage fitting 16. FIGS. 3A, 3B, 4A and 4B show the position of yokes 24 and 34 in both the open and closed positions. FIG. 3A shows an open unloaded position of swage tool 10 and FIG. 3B shows a closed unloaded position to illustrate the positions of inner yoke 34 and outer yoke 24.

As shown in FIG. 4A, an operator may begin to swage one side of fitting 16 by engaging swaging ring 15 with outer yoke 24 to restrain swaging ring 15 from movement during swaging. Inner yoke 34 is then positioned to engage with sleeve 14. Pressure introduced through hose assembly 11 and port 21 acts against ram 50 and moves piston 30 axially toward the plug end of housing 20, thereby compressing spring 43 and moving swaging ring 15 over sleeve 14 and swaging ring 15 over tube 13, as shown in FIG. 4B. One end of spring 43 contacts piston rod 40 while the other end contacts plug 44. At the end of the swaging operation, the pressure is reduced and spring 43 returns piston 30 and ram 50 toward the port-end of housing 20 and thereby separates inner yoke 34 and outer yoke 24. This returns tool 10 to the ready position for the next swaging operation. Spring 43 normally biases ram 50 to contact the port-side end of housing 20.

In assembling swage tool 10, carbon fiber bearings 52, 54 are placed onto the cylindrical outer surface of the ram and the outer surface portion of piston rod 40 that will slidably engage with housing 20. Next, ram 50 is inserted into housing 20 adjacent to port opening 21. Piston 30 is inserted into housing 20 next to ram 50. Piston rod 40 is then screwed into ram 50 while passing through piston 30. Spring 43 is inserted into spring holder 42 and housing 20 is sealed with plug 44. Seals 46 and 47 are also inserted into housing 20. Port opening 21 is connected to either a hydraulic source or quick connect hose assembly 11.

Swaging tool 10 of the present invention is of reduced weight and size, thereby allowing swaging operations to be performed in previously inaccessible areas. The lower weight of the tool reduces operator fatigue and increases productivity in at least the aerospace, marine, petroleum and chemical industries.

The particular embodiments of the invention described in this document are illustrative and not restrictive. Modification may be made without departing from the spirit of the invention as defined by the following claims.

The invention claimed is:
1. A swage tool for swaging axially swaged fittings comprising:
  a housing having an inner surface and a first yoke;
  a ram having a recessed portion with a threaded inner surface portion;
  a piston having a second yoke;

a piston rod having a spring holder and a threaded portion screwed into the threaded inner surface portion of the ram;

a spring connected to the spring holder; and carbon fiber bearings provided on the ram and on an outermost surface portion of the piston rod at a widest diameter in axial slidable engagement with the inner surface of the housing such that the ram and the outermost surface portion of the piston rod do not directly slidably engage with the inner surface of the housing.

2. The swage tool of claim 1, wherein the housing further comprises a port opening attachable to a hose assembly or pressure source.

3. The swage tool of claim 2, wherein the pressure source is a hydraulic fluid pressure source.

4. The swage tool of claim 1, further comprising a seal between a port opening and the ram that prevents pressurized fluid from seeping past the ram.

5. The swage tool of claim 1, further comprising a pair of legs provided on each of the piston and the housing and connected to the first and second yokes.

6. The swage tool of claim 1, further comprising a plug attached to the housing and in contact with the spring.

7. The swage tool of claim 1, wherein the inner surface of the housing is cylindrical.

8. The swage tool of claim 1, wherein the first and second yokes are substantially U-shaped and accept a swaging ring and a sleeve.

9. The swage tool of claim 1, wherein the first and second yokes include a jaw for secure attachment to a swaging ring and a sleeve.

10. A swaging system for joining a first member to a second member comprising:

a fitting including a sleeve inserted over the first and second members;

a first ring provided over the sleeve to axially swage the sleeve to the first member;

a second ring provided over the sleeve to axially swage the sleeve to the second member;

a swage tool comprising:

a housing having an inner surface and a first yoke;

a ram having a recessed portion with a threaded inner surface portion;

a piston having a second yoke;

a piston rod having a spring holder and a threaded portion screwed into the threaded inner surface portion of the ram;

a spring connected to the spring holder; and carbon fiber bearings provided on the ram and on an outermost surface portion of the piston rod at a widest diameter in axial slidable engagement with the inner surface of the housing such that the ram and the outermost surface portion of the piston rod do not directly slidably engage with the inner surface of the housing, wherein the first and second yokes engage the sleeve and either the first or second ring.

11. The swaging system of claim 10, wherein the housing further comprises a port opening attachable to a hose assembly or pressure source.

12. The swaging system of claim 11, wherein the pressure source is a hydraulic fluid pressure source.

13. The swaging system of claim 10, further comprising a seal between a port opening and the ram that prevents pressurized fluid from seeping past the ram.

14. The swaging system of claim 10, further comprising a pair of legs provided on each of the piston and the housing and connected to the first and second yokes.

15. The swaging system of claim 10, further comprising a plug attached to the housing and in contact with the spring.

16. The swaging system of claim 10, wherein the inner surface of the housing is cylindrical.

17. The swaging system of claim 10, wherein the first and second yokes are substantially U-shaped and accept a swaging ring and a sleeve.

18. The swaging system of claim 10, wherein the first and second yokes include a jaw for secure attachment to a swaging ring and a sleeve.

19. A method of assembling a swage tool comprising:

a) attaching a carbon fiber bearing over a ram and an outermost surface of a piston rod at a widest diameter;

b) inserting the ram within a housing;

c) inserting a piston adjacent to the ram within the housing;

d) inserting the piston rod through the piston; and e) screwing a threaded portion of the piston rod into a threaded inner surface portion of the ram, wherein the ram and the outermost surface portion of the piston rod do not directly slidably engage with an inner surface of the housing.

20. The method according to claim 19, wherein the ram is inserted adjacent to a port opening of the housing.

21. The swage tool of claim 1, wherein the piston rod includes a central hole extending from the spring holder to an opposite end of the piston rod.

* * * * *